(12) United States Patent
Duffner et al.

(10) Patent No.: US 10,946,571 B2
(45) Date of Patent: Mar. 16, 2021

(54) MOULD CLAMP WITH MOULD HEIGHT ADJUSTMENT SYSTEM AND METHOD FOR THE ACTUATION THEREOF

(71) Applicant: ARBURG GMBH + CO KG, Loßburg (DE)

(72) Inventors: Eberhard Duffner, Starzach (DE); Rainer Bletscher, Baiersbronn (DE)

(73) Assignee: ARBURG GMBH + CO KG, Lossburg (DE)

( * ) Notice: Subject to any disclaimer, the term of this patent is extended or adjusted under 35 U.S.C. 154(b) by 210 days.

(21) Appl. No.: 16/343,063

(22) PCT Filed: Oct. 16, 2017

(86) PCT No.: PCT/EP2017/076363
§ 371 (c)(1),
(2) Date: Apr. 18, 2019

(87) PCT Pub. No.: WO2018/073179
PCT Pub. Date: Apr. 26, 2018

(65) Prior Publication Data
US 2019/0263037 A1    Aug. 29, 2019

(30) Foreign Application Priority Data
Oct. 18, 2016  (DE) ..................... 10 2016 119 840.4

(51) Int. Cl.
*B29C 45/17*   (2006.01)
*B29C 45/66*   (2006.01)
*B29C 45/76*   (2006.01)

(52) U.S. Cl.
CPC .......... *B29C 45/1751* (2013.01); *B29C 45/66* (2013.01); *B29C 45/7653* (2013.01)

(58) Field of Classification Search
CPC .. B29C 45/1751; B29C 45/66; B29C 45/7653
See application file for complete search history.

(56) References Cited

U.S. PATENT DOCUMENTS 4,281,977 A   8/1981  Farrell
4,716,952 A   1/1988  Hegel
(Continued)

FOREIGN PATENT DOCUMENTS

DE   2812301 A1   11/1978
DE   19812741 A1   9/1999
(Continued)

OTHER PUBLICATIONS

International Search Report for corresponding application PCT/EP2017/076363 filed Oct. 16, 2017; dated Jan. 18, 2018.

*Primary Examiner* — Nahida Sultana
(74) *Attorney, Agent, or Firm* — Cantor Colburn LLP

(57) ABSTRACT

The invention relates to a mould clamp for an injection moulding machine, comprising a device for automatically adapting to the mould height of injection moulds (13) of different heights (a). A clamping device supported on an adjustable supporting element (21) is provided for moving a movable mould carrier (11) in the clamping direction (s-s) towards and away from the stationary mould carrier (10). A distance (x) between the stationary mould carrier (10) and the adjustable supporting element (21) can be adjusted by moving the supporting element, by means of a mould height adjustment system (14). A locking device (16) detachably locks the supporting element (21) in the respective position thereof, by pretensioning locking elements. A dynamically actuatable mould height adjustment system is produced by the locking elements being selectively relieved or pretensioned by active actuating elements, the pretension being cancelled in order to release the mould height adjustment system (14).

15 Claims, 6 Drawing Sheets

(56) References Cited

U.S. PATENT DOCUMENTS

Figure 1:
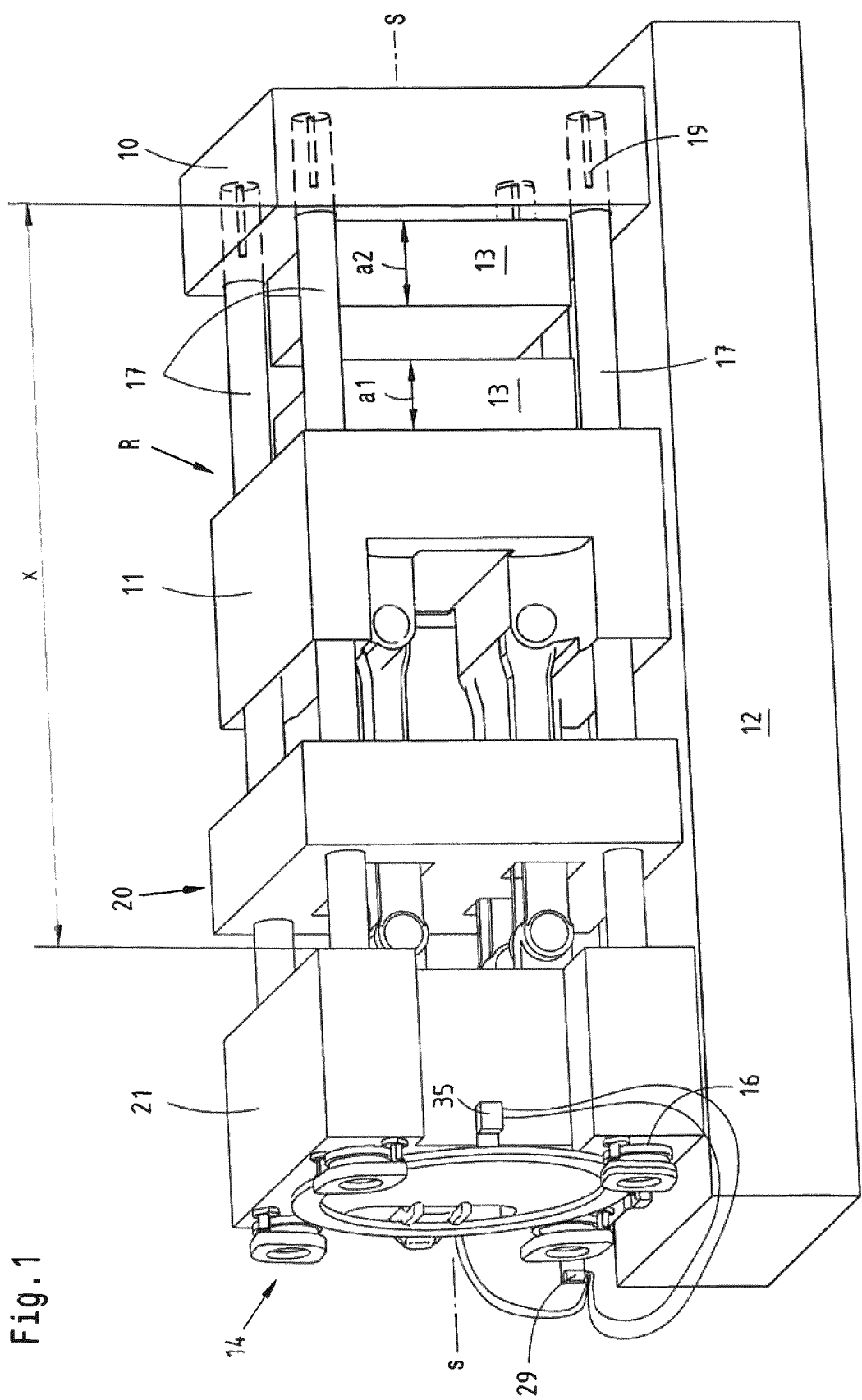

| | | | | |
|---|---|---|---|---|
| 6,050,804 A | * | 4/2000 | Tamaki | B29C 45/1751 100/258 A |
| 6,719,553 B1 | * | 4/2004 | Hehl | B29C 45/1751 425/190 |
| 2003/0082269 A1 | * | 5/2003 | Morwald | B29C 45/66 425/589 |
| 2005/0214406 A1 | * | 9/2005 | Hehl | B29C 45/1751 425/589 |

FOREIGN PATENT DOCUMENTS

| | | |
|---|---|---|
| EP | 1487626 B1 | 3/2019 |
| JP | 036907 U | 1/1991 |
| WO | 9948667 A1 | 9/1999 |
| WO | 03076161 A1 | 9/2003 |
| WO | 2006003046 A1 | 1/2006 |

* cited by examiner

Fig.6
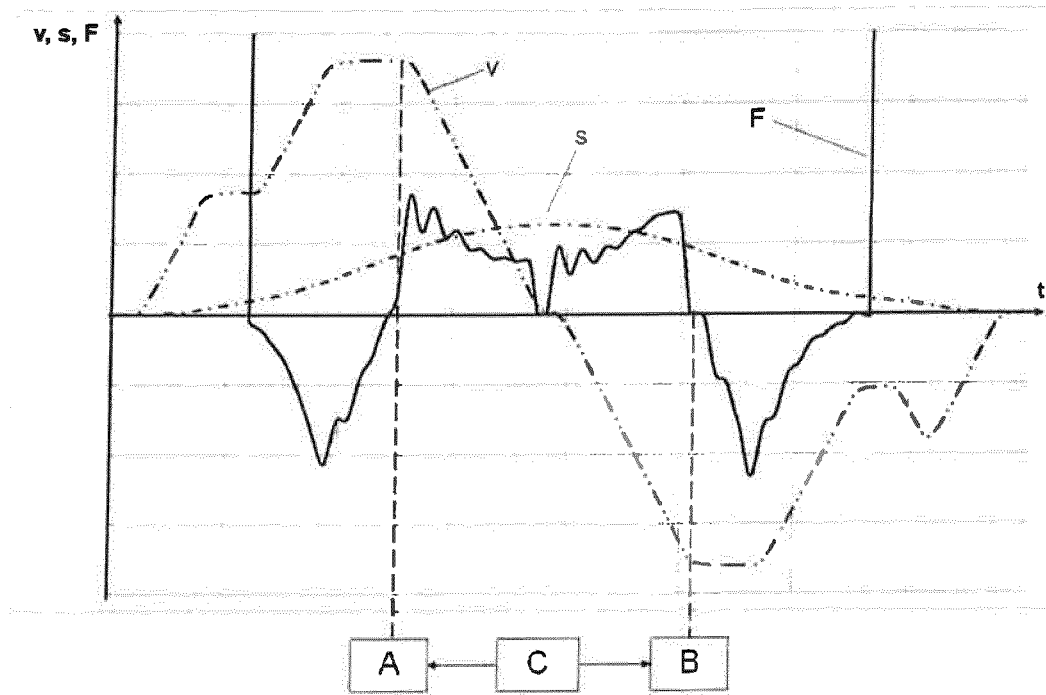
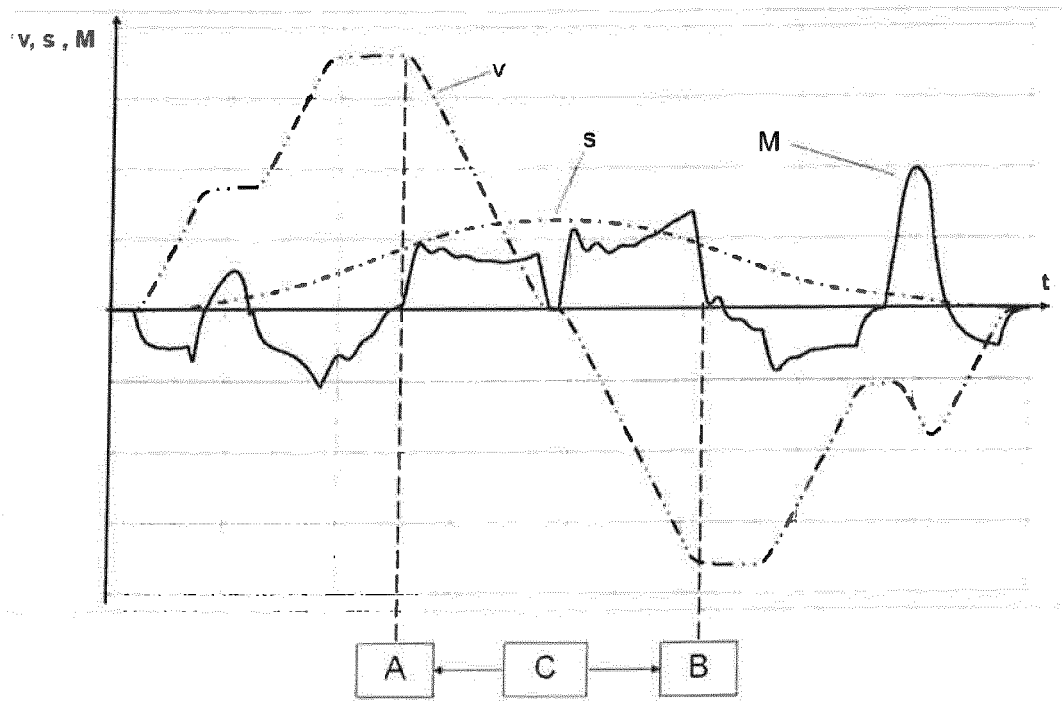

MOULD CLAMP WITH MOULD HEIGHT ADJUSTMENT SYSTEM AND METHOD FOR THE ACTUATION THEREOF

CROSS REFERENCE TO RELATED APPLICATIONS

The present application relates to and claims the priority of German patent application 10 2016 119 840.4, filed on 18 Oct. 2016, the disclosure of which is hereby expressly incorporated by reference into the subject matter of the present application in its entirety.

FIELD OF THE INVENTION

The invention relates to a mould closing unit for an injection moulding machine for processing plastics and other plasticisable materials, having a mould height adjustment device, according to the preamble of claim 1, and to a method for the actuation of a mould height adjustment device of this kind, according to the preamble of claim 12.

PRIOR ART

Mould height adjustment devices are in particular required on injection moulding machines when a toggle lever drive is used to open and close the injection moulding machine. A toggle lever drive of this kind works most efficiently when its extended position coincides approximately with the position of the movable platen in relation to the stationary platen when the mould is closed—that is to say when the parts of the injection mould abut against one another. However, this position is dependent on the so-called mould height. Here, the term "mould height" is understood to mean the spacing, measured in the closing direction, between the movable and the stationary platen when the mould is closed.

Devices for adjusting the mould height are known, and these take the form on the one hand of biased systems with no play and on the other those with play, with the disadvantage of greater wear and impact noise.

EP 1 487 626 B1, which forms the basis for the preamble of claim 1, discloses a play-free variant of a mould closing unit having a mould height adjusting arrangement. A mould height adjustment device of this kind, with no play, is more complex than one with play, since the bias has to be relieved in order to move the mould height adjustment device. It is disadvantageous that with this mould height adjustment device this relief is only possible at an operating point on the closing unit that is outside the conventional operational range. For this purpose, the mould closing unit is moved for example into an end position in which the biasing elements are relieved of load automatically. In this position, the mould height adjustment device can be repositioned with little friction. The bias is thus relieved of load purely for the purpose of setting the mould height during the changeover operation, for example when there is a change of injection mould. For the purpose of setting this changed mould height, it is necessary to move into a specific released position which can only be reached during the changeover operation but cannot be reached in the course of a normal injection moulding operation.

DE 198 12 741 A1 discloses a mould height adjustment device in which the mould closing unit can use its own closing device to adjust the position of the supporting element. For this purpose, a respective locking device is provided on the movable platen and on the supporting element for the closing device. In the normal condition for the manufacturing process, the supporting element is locked and the movable platen is released for movement—that is to say is unlocked. If the mould height is to be changed, the movable platen is locked and the supporting element is released, with the result that when the closing device is actuated the position of the supporting element can be changed. The mould height adjustment device is only unlockable and adjustable in the absence of load. For this purpose, the operating force and the dynamic motion forces must be relaxed (be set to zero) so that the mould height adjustment device can be "unlocked" and moved by setting the movable platen using the drive train. Removing the load in the course of operation results in force components being released in an uncontrolled manner and so damages the system. Moreover, above a certain machine size, a device of this kind is no longer suitable for moving the supporting element evenly and without tilting.

U.S. Pat. No. 4,281,977 A discloses a mould height adjustment device in which threaded portions, connected to nuts, are provided on bars that are usually fixed to the stationary platen and serve to guide the movable platen. The nuts are driven by way of a separate drive for the mould height adjustment device. On their outer side, the nuts have a gear ring, with the result that they can be actuated using either a gear ring or a toothed belt.

DE 28 12 301 A1 discloses a mould closing unit for injection moulding machines on which locking nuts are provided with lubricant by way of corresponding lubricant ducts.

OBJECT OF THE INVENTION

Taking this as a starting point, the object of the present invention is to provide a mould closing unit having a mould height adjustment device that permits dynamic actuation. This is achieved by a mould closing unit having the features of claim 1, and by a method having the features of claim 12. Advantageous further developments form the subject matter of the dependent claims. The features set forth individually in the claims are combinable with one another in a technically useful manner, and can be supplemented by explanatory statements in the description and details from the Figures, wherein further variants of embodiments of the invention are indicated.

The mould closing unit has a stationary platen, a movable platen and a closing device for moving the movable platen in a closing direction, towards the stationary platen and away therefrom. For the closing device there is further provided an adjustable supporting element. Using a mould height adjustment device, the spacing between the stationary platen and the movable supporting element may be adjusted by moving the supporting element. For this purpose, a drive is provided for actuating the mould height adjustment device. The supporting element can be releasably locked in its current position, biased by locking elements, using a locking device. According to the invention, by means of active actuation elements the locking elements are selectively relieved of load by removing the bias for the purpose of releasing the mould height adjustment device, or biased so the locking elements are relievable of load where necessary.

Active actuation makes it possible for the user to release or actuate the locking elements and hence the mould height adjustment device dynamically where necessary, preferably by actively actuable actuation elements—that is to say that setting of the mould height or a correction may be carried out even during the actual course of movement of the closing unit as it closes and opens the injection mould. In conjunction with a suitable sensor system, it is thus possible at any time to bring about a precisely parallel configuration of the platens and hence to affect the quality of the injection mouldings manufactured. Rapidly releasing the biasing force makes it possible to actively control the closing force.

Because the locking elements, such as nuts, can be given a bias in operation, a relatively large play in the thread between the bar or column—acting as the guide element for the platens—and the associated nut is also possible, since in this way the play does not have a negative effect either in the form of a clattering noise or in terms of accelerating wear. At the same time, assembly of the injection moulding machine is facilitated, and the manufacturing costs are reduced. During the actual operation, there is no continuous changing between the edges of the nuts in the thread as a result of the dynamics and the closing force, since these can be influenced in targeted manner.

Preferably, during movement of the movable platen in the closing direction towards the stationary platen and away therefrom, the locking device may be released by removing the bias. As an alternative, or at the same time, the mould height adjustment device is actuable during movement of the movable platen, for the purpose of adjusting the spacing between the supporting element and the platen. It is thus also possible to respond to changing conditions, individually and within a cycle, while the cycle is still going on.

The mould height adjustment device is preferably arranged on an adjustment plate that takes the form of a supporting element. This adjustment plate may be a separate plate that is itself adjustable in relation to a supporting element, but it may also be integrated into the supporting element. A mould height adjustment device of this kind, with a supporting element, is likewise usable in a two-plate system, in which the mould height adjustment device may be mounted on one of the platens.

Preferably, the mould height adjustment device has nuts as locking elements, which engage with threaded portions on guide elements for the supporting element, and are adjustable using a drive of the mould height adjustment device. This produces a simple, inexpensive and reliable—and moreover already used on many injection moulding machines—connection between the locking elements and the guide bars or guide columns of the injection moulding machine.

It is advantageous if the nuts for the mould height adjustment device are at the same time used as locking elements, and moreover the actuation element by which the locking elements are relievable of load is at the same time also the connection device that operatively connects the nuts to one another. As a result, a multiple effect is produced using one and the same component, and this contributes to favourable and effective manufacture of the mould closing unit.

Advantageously, under the action of the resilient devices, there are provided on each guide element in each case two nuts which are lockable to one another as a result of the action of the resilient devices. This produces play-free locking to the threaded portions of the guide bars, which can easily be unlocked again at any time by the actuation elements.

Preferably, the nuts abut against a clamping plate and against the supporting element, the two of which are connected to one another by the at least one connection device, in order to additionally clamp the nuts and secure them between them when the locking device is actuated. This produces reliable and secure locking.

In order to lubricate the mould height adjustment device sufficiently, a multiple-step lubrication concept is provided. Preferably, the nuts have connection ducts and/or grooves that are connected to a lubricant tank for the purpose of conveying lubricant to the threaded portions. Preferably, lubrication is carried out by way of a stationary inlet on the counter-bearing plate. By way of this inlet, a lubricant tank feeds directly to the two nuts. The connection ducts and peripheral grooves ensure that there is optimum distribution of the lubricant to the thread contact points of the two nuts.

Preferably, the actuation element is formed by a piston rod of a piston-and-cylinder unit. The piston rod is connected to a piston that is mounted on the supporting element and is actuable in opposition to the force of the resilient devices. In principle, other reciprocating elements by which the force of the resilient devices may where necessary be removed are also conceivable. For example, pneumatic or electromechanical elements are conceivable.

The cylinder chamber of the piston-and-cylinder unit is arranged in the supporting element, and the piston rod mounted on the clamping plate passes through the resilient devices, which are likewise mounted on the supporting element. This produces a compact structure for a piston-and-cylinder unit that is mounted in opposition to the force of resilient devices. At the same time, it is securely mounted on the supporting element.

Preferably, the forces are optimally matched if the biasing force of the resilient devices is greater than the dynamic forces when the injection mould is opened and closed—that is to say when the injection moulding machine is operated—and if the force of the actuation elements is itself greater than this biasing force of the resilient devices. If this is taken into account, an operating state with no play can be achieved without adjustment. As soon as the process makes modifications to the mould height necessary, the actuation element (piston) can be used to remove the bias in the defined region, which constitutes the technical basis for low-wear adjustment. By contrast, if the biasing force is less than or equal to the operating force, the result may be an unpleasant clattering effect, since as the load is changed different thread edges are put under load, which increases wear. If the bias is selected to be too great and is either not completely or not at all "relieved" for the adjustment procedure, then the adjustment procedure will be subject to wear, in which case the system will soon be destroyed.

According to the invention, the object is also achieved by a method having the features of claim 12, in which there are provided on an injection moulding machine a stationary platen, a movable platen, at least one adjustable supporting element for a closing device, a driven mould height adjustment device and a locking device. Here, the method has the following steps: removal of the bias by actively relieving the locking elements of load and release of the locking elements from their current position; releasing the mould height adjustment device; changing the spacing between the stationary platen and the supporting element by moving the supporting element using the drive; fixing the mould height adjustment device by locking the locking device, by applying the bias again. As a result of this method, the mould height adjustment device can be actuated at any time dynamically and actively. This in particular enables active control of the closing force. Moreover, a greater thread play is possible between the guide and the nut.

Advantageously, the locking device is unlocked during movement of the movable platen in the closing direction, and/or the mould height adjustment device is actuated during movement of the movable platen for the purpose of adjusting the spacing. This is as much as to say that active unlocking of the mould height adjustment device is possible at any time in order consequently to counter actively even brief deviations from the intended course of the movement or the closing force. The user or the machine control system can thus influence the injection cycle in a highly dynamic manner, even during the current injection cycle.

Preferably, during operation of the injection moulding machine, a dynamic operating force acting on the supporting element and the total force are determined and monitored. This makes it possible to ensure that the locking elements are relieved of load within a period of time in which the determined total force is greater than or equal to zero. In this way, it is possible to use the total force characteristic to identify within the opening and closing movement of the mould closing unit a region within which low-wear and low-noise adjustment is possible without changing the load on the nut thread.

Further advantages are apparent from the subclaims and the description given below of a preferred exemplary embodiment.

SHORT DESCRIPTION OF THE FIGURES

Figure 2:
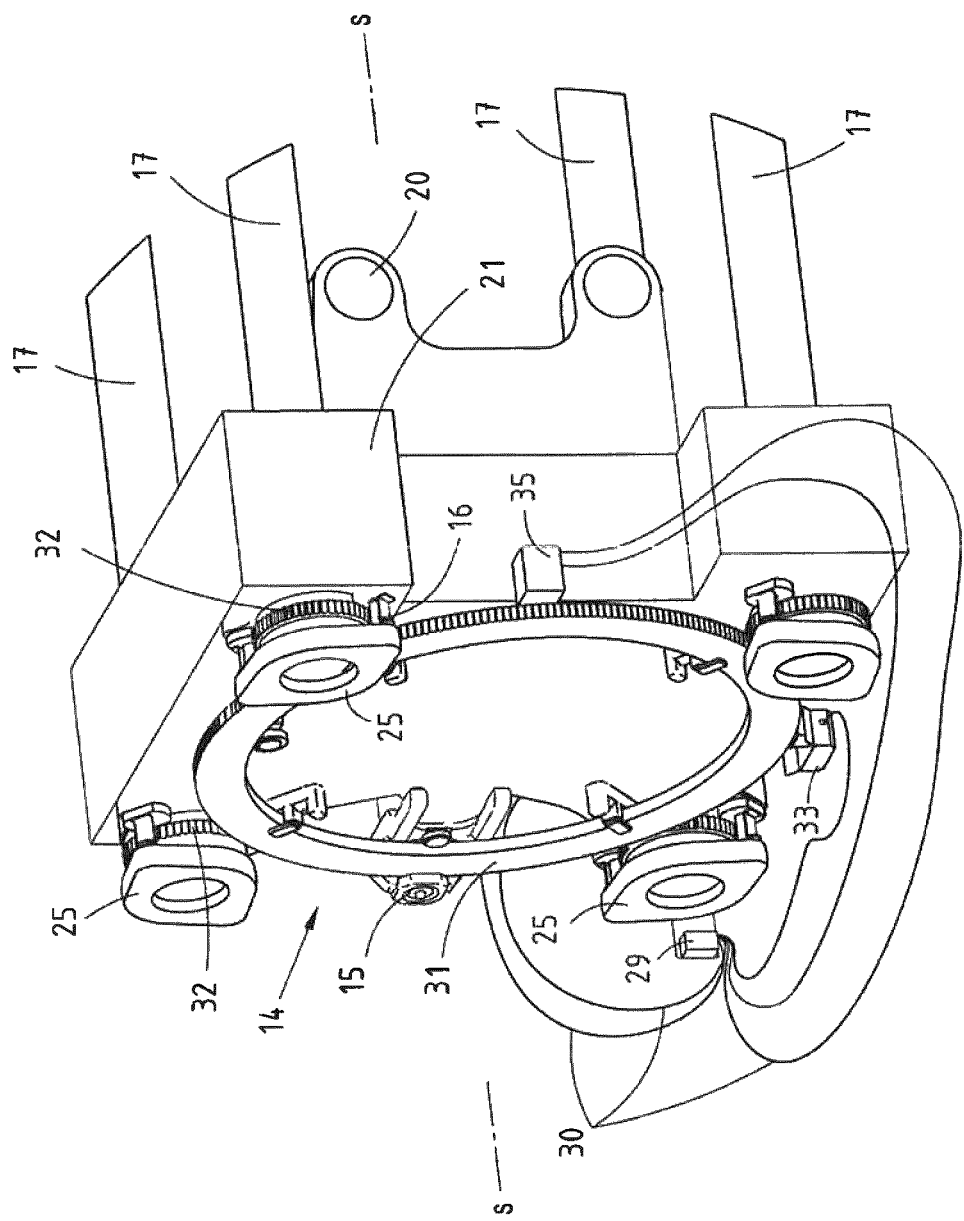
Figure 3:
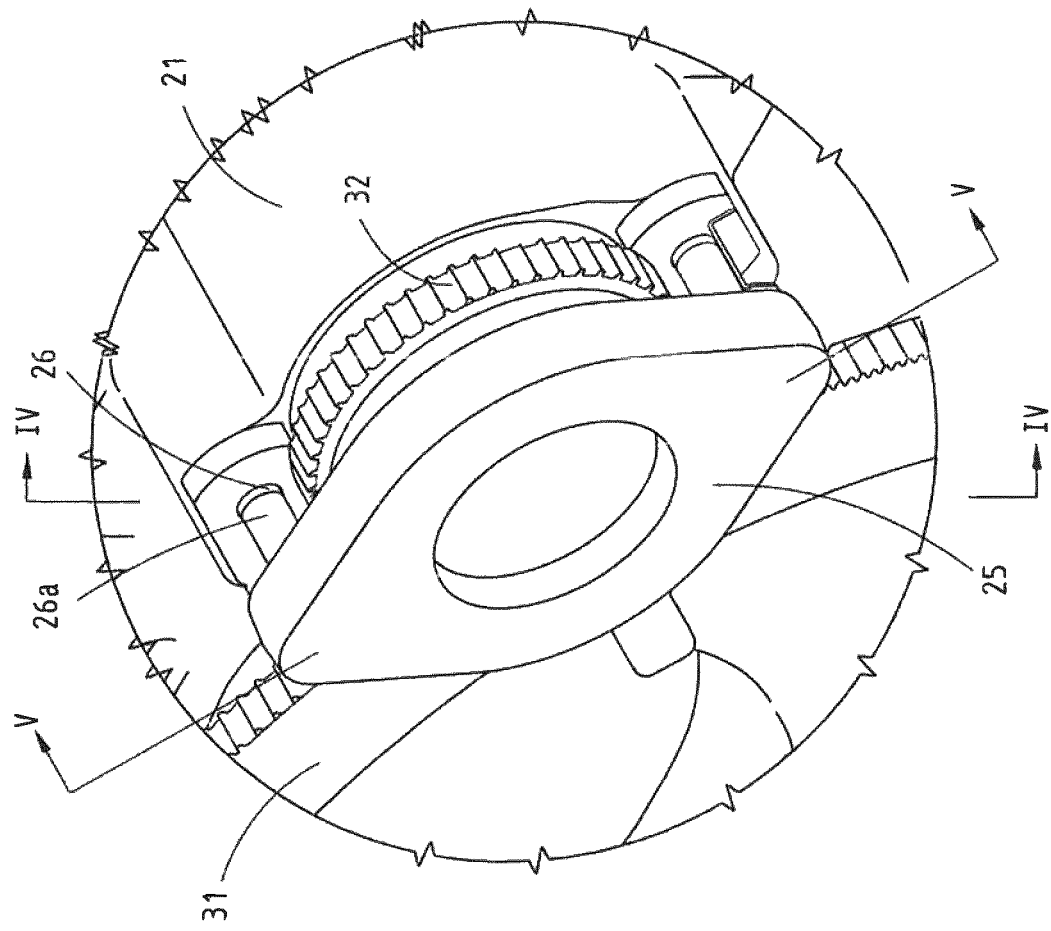
Figure 4:
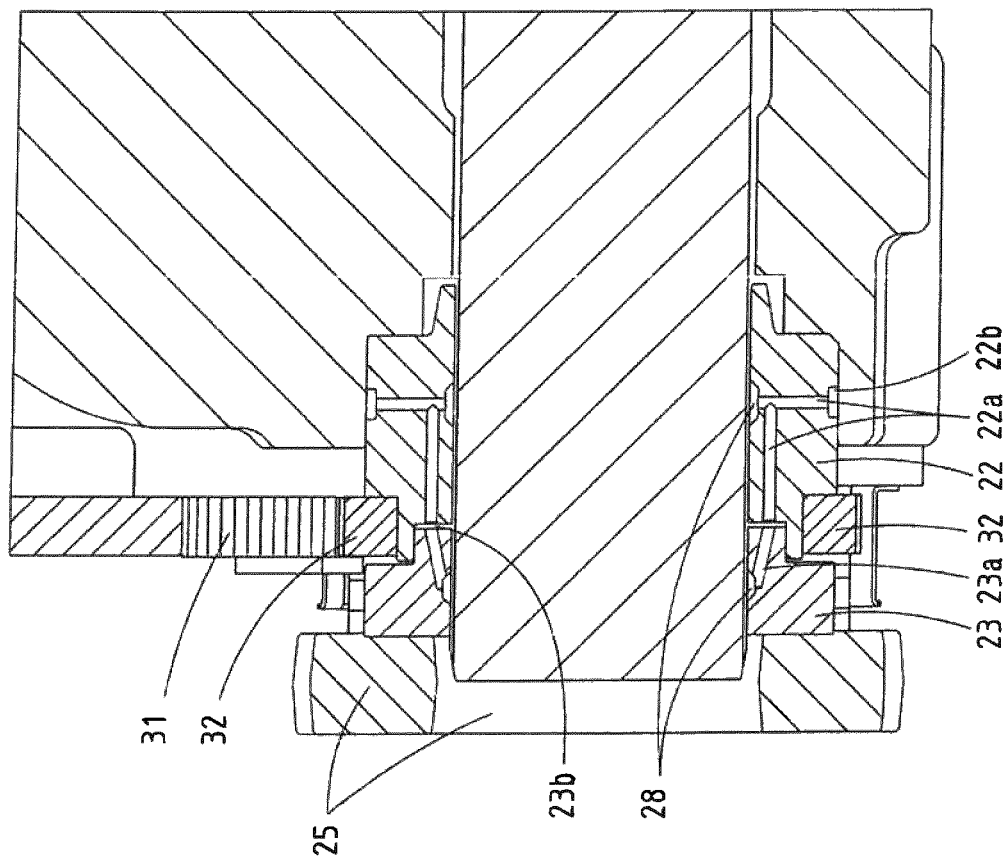
Figure 5:
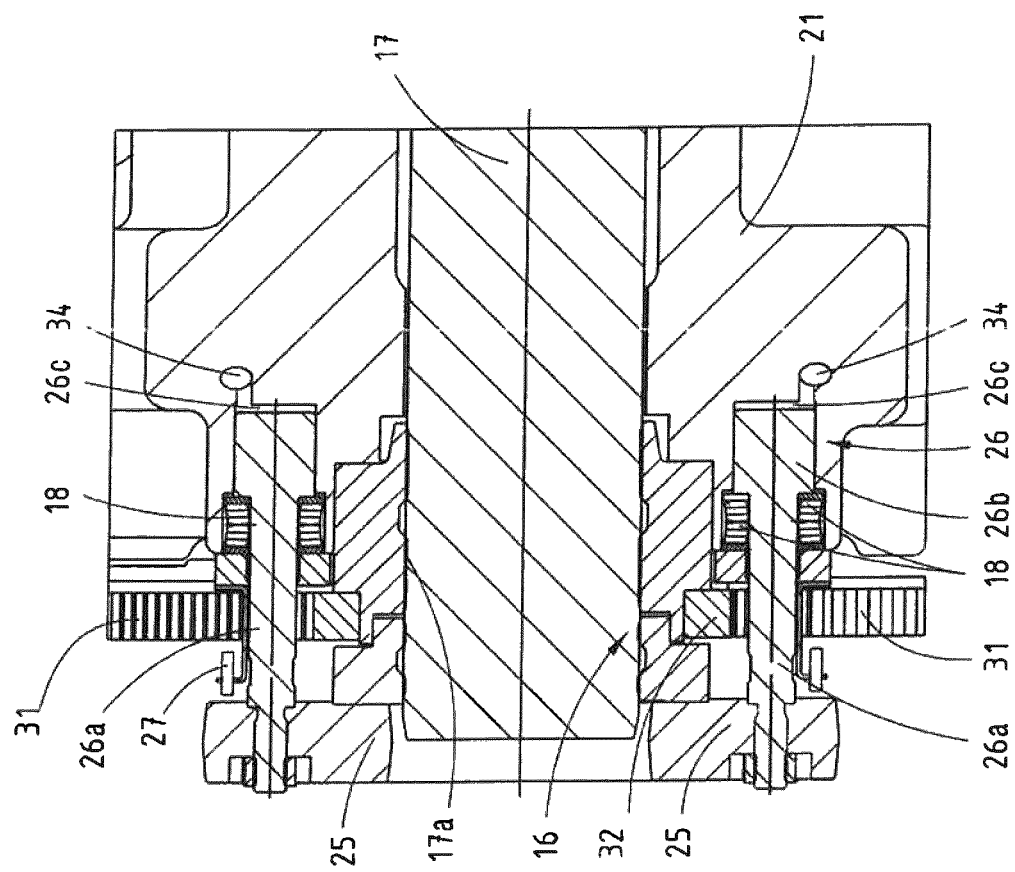

The invention is explained in more detail below with reference to an exemplary embodiment. In the Figures:

FIG. 1 shows a three-dimensional side view of a mould closing unit for an injection moulding machine, having a mould height adjustment device according to the invention, FIG. 2 shows an enlarged detail of the injection moulding machine according to FIG. 1, in the region of the supporting element, FIG. 3 shows an enlarged detail of FIG. 2, in the region of the locking device, FIG. 4 shows a section through the locking device along the line IV-IV in FIG. 3, FIG. 5 shows a section through the locking device along the line V-V in FIG. 3, and FIG. 6 shows a graph showing the dynamic operating force on the adjustment plate in the axial direction of the closing unit, over the time of an injection cycle.

DETAILED DESCRIPTION OF PREFERRED EXEMPLARY EMBODIMENTS

The invention is now explained in more detail by way of example, with reference to the attached drawings. However, the exemplary embodiments are only examples, which are not intended to restrict the inventive concept to a particular arrangement. Before the invention is described in detail it should be pointed out that it is not restricted to the respective constituent parts of the device and the respective method steps, since these constituent parts and method may vary. The terms used here are merely intended to describe particular embodiments and are not used restrictively. Moreover, where the singular or the indefinite article is used in the description or the claims, this also refers to a plurality of these elements unless the overall context unambiguously indicates otherwise.

FIG. 1 shows, in a perspective side view, a mould closing unit for an injection moulding machine, which may be used to process plastics and other plasticisable materials, such as powder or ceramic materials. Arranged on the machine base 12 is the mould closing unit, which has a stationary platen 10 and a movable platen 11. Between the platens, in a mould clamping space R, there may be arranged injection moulds 13, which may also have different mould heights. The mould height of the overall mould is the dimension resulting from the sum of dimensions $a_1$ and $a_2$. Equally, when an injection mould is in a clamped position, this sum corresponds to the minimum spacing between the platens in the closing direction s-s. The movable platen 11 is actuated by way of a closing device 20 which, in the exemplary embodiment, is formed by a toggle lever mechanism, though in principle any other desired drive unit may also be used. Thus, instead of the hydraulic or pneumatic piston-and-cylinder units described, it is also possible to use electromechanical drives or linear drives or other drive arrangements as the closing device 20.

In the exemplary embodiment, guide elements 17 are provided as guide bars that are mounted on the stationary platen. Guide bars of this kind are sometimes also called columns. In the exemplary embodiment, they serve to guide both the movable platen 11 and the supporting element 21 as they move (described below). In principle, the mould height adjustment device described below may also be used on an injection moulding machine without bars, however, in which the stationary platen 10 and the movable platen 11 are connected to one another by way of a force-transmitting element guided around the mould clamping space R—for example one or more U-shaped clamps.

The adjustable supporting element 21 carries the closing device 20, which is used to actuate the movable platen 11, in the direction of the movable platen. Associated with the supporting element 21 is a mould height adjustment device 14 for adjusting the spacing x between the stationary platen 10 and the adjustable supporting element 21 by moving the supporting element. The mould height adjustment device 14 is actuable by way of a drive 15, which is illustrated in FIG. 2. In FIG. 2, all that is visible of this drive is the drive wheels, by which a drive gearwheel 31 that is central in respect of the closing direction is driven at its outside. This drive gearwheel 31 is also in operative connection, by way of its external teeth, with output gearwheels 32, which are discussed in more detail below. According to FIG. 2, a locking device 16 for releasably locking the supporting element 21 is provided in its current position by biasing locking elements, which in the exemplary embodiment are formed by the nuts 22, 23 in FIGS. 3 to 5.

The locking elements are relievable of load by active actuation elements 26, in the exemplary embodiment by reciprocating elements that are described in more detail below, by removing the bias of the locking elements, to release the mould height adjustment device 14. Active actuation makes it possible to actuate the mould height adjustment device 14 at any time. Thus, the locking device 16 can be released even during movement of the movable platen 11 in the closing direction s-s towards the stationary platen 10 and away therefrom, by removing the bias. As an alternative, or at the same time, the mould height adjustment device 14 is also actuable, for the purpose of adjusting the spacing x, during movement of the movable platen 11. This makes it possible for the user to carry out a mould height adjustment or a correction dynamically—that is to say also during the course of movement of the closing unit—if for example the temperature conditions change, or if, for example in the case of a mould closing unit with a toggle lever mechanism, the desired extended position of the toggle lever can no longer be reached.

The mould height adjustment device 14 is illustrated in the exemplary embodiment on a column-guided three-plate closing unit, that is to say that in addition to the stationary platen 10 and the movable platen 11 a supporting element 21 for the closing device 20 is provided. However, the device may also be used with other closing concepts, such as two-plate closing units or closing units with no bars. In the case of two-plate closing units, the mould height adjustment device is then usually associated with one of the platens, in particular the stationary platen 10. In the case of closing units with no bars, the mould clamping space R is conventionally free of force-transmitting elements between the platens, since elements in the manner of U-shaped clamps are guided around the mould clamping space R as force-transmitting elements, instead. There may be received in the mould clamping space injection moulds 13 of variable height a, as measured in the closing direction s-s, with the result that where appropriate the mould height must also be adapted by way of the mould height adjustment device 14. The mould height adjustment device 14 is arranged on an adjustment plate that takes the form of a supporting element 21—that is to say that the supporting element is adjustable and hence movable in the closing direction s-s.

According to FIGS. 4 and 5, the locking elements are formed by nuts 22, 23 that engage with threaded portions 17a on the guide elements 17—that is to say on the bars or columns—for the supporting element 21, and are adjustable using the drive 15. At the same time, the actuation element 26 is at least one connection device which brings the nuts 22, 23 into operative connection. The at least two nuts 22, 23 are lockable—that is to say are biased during operation—as a result of the action of resilient devices 18, which in the exemplary embodiment according to FIG. 5 are formed by cup spring packs. In the biased position, there is a minimal gap between the nuts 22 and 23; that is to say the nuts are pressed against the thread of the threaded portions 17a and are hence fixed in their current position. Because the nut 22 is mounted on the adjustment plate or the supporting element 21, this also fixes the supporting element. First the nut 22, which is driven by way of an output gearwheel 32, engages in the threaded portion 17a of the guide elements 17. According to FIGS. 2 and 3, each guide element 17 has an output gearwheel 32 of this kind, which according to FIGS. 4 and 5 is secured to the nut 22 by way of securing devices or is in one piece therewith. The output gearwheels 32 are driven by way of a central drive gearwheel 31, according to FIG. 2. In the case of large closing units, the drive gearwheel 31 is mounted in the gear assembly by a vertical support, with compensation for gravity. The drive gearwheel 31 is itself driven by way of the drive 15, wherein this drive is preferably position-controlled, and may take a servo-electrical or hydraulic form.

The second nut 23 acts on the same thread, and locks the nut 22 against the nut 23 by resilient devices 18. The form taken by the nut locking makes it possible to pair the tolerance for the thread to the threaded portion 17a in a manner reducing wear, or to permit greater tolerances in the dimensioning of parts.

The nuts 22, 23 abut against a clamping plate 25 and against the supporting element 21, both of which are in operative connection with one another by way of the at least one connection device—that is to say the actuation element 26. In the exemplary embodiment, the actuation element 26 takes the form of a hydraulic piston-and-cylinder unit. However, it may also be constructed as a pneumatic or electromechanical element. According to FIG. 5, the actuation element 26 has a piston rod 26a for a piston 26b, wherein the piston is mounted on the supporting element 21 and is actuable in opposition to the force of the resilient devices 18. As a result of supplying hydraulic medium to the cylinder chamber 26c, which is arranged in the supporting element 21, the piston 26b can be moved to the left, as seen in FIG. 5. This compresses the resilient devices 18, and the clamping plate 25, which is secured to the piston rod 26a of the piston-and-cylinder unit, likewise moves further left as seen in FIG. 5. This produces a play between the nuts 22 and 23—that is to say that the nuts are no longer locked. If the drive gearwheel 31 is now actuated by way of the drive 15, the output gearwheels 32 and hence the nuts 22, 23 can turn. This results in an adjustment of the supporting element 21. The cylinder chamber 26c of the piston-and-cylinder unit is arranged in the supporting element 21, and in the exemplary embodiment the piston rod 26a, which is mounted on the clamping plate 25, passes through the resilient devices, which are likewise mounted on the supporting element. Before actuation of the mould height adjustment device 14, sensors 27 are used to check whether the bias has in fact been removed.

Preferably, the biasing force of the resilient devices 18 is greater than the forces occurring when the injection mould 13 is opened and closed, with the result that the supporting element 21 is reliably fixable in its current position. On the other hand, the force of the actuation elements 26 is greater than the biasing force of the resilient devices 18, so that this bias can where necessary be removed. If this is taken into account, it is possible to achieve a play-free operating state without adjustment. As soon as the process makes modifications to the mould height necessary, the actuation element 26 (piston) can be used to remove the bias in the defined region, which constitutes the technical basis for low-wear adjustment. By contrast, if the biasing force is less than or equal to the operating force, the result may be an unpleasant clattering effect, since as the load is changed different thread edges are put under load, which increases wear. If the bias is selected to be too great and is either not completely or not at all "relieved" for the adjustment procedure, then the adjustment procedure will be subject to wear, in which case the system will soon be destroyed.

In the exemplary embodiment according to FIG. 5, the actuation element 26 is formed by two piston rods 26a of the piston-and-cylinder unit that are arranged diametrically opposite one another in relation to the centre axis of the guide elements 17, in order to relieve the resilient devices 18 of load. As an alternative, it is also possible for only one actuation element to be provided, with a counter-bearing, or it is likewise conceivable to provide more than two actuation elements, if this is required for symmetry of forces. The preferably used sensors 27 allow the stroke movement to be monitored for whether the respective end positions of the stroke movement have been reached. This monitoring should preferably be provided on each actuation element in order to avoid damage to the threads.

A precision adjustment to the force distribution over the individual guide elements is made on the opposite side of the guide elements 17, in a manner not illustrated in the drawing. A manually adjustable hollow nut acts on this counter-bearing as a precision adjustment element. The objective of this way of making an adjustment is to bring the stationary platen 10 and the movable platen 11 into a parallel configuration in relation to one another, and to achieve a symmetrical force distribution in the guide elements.

The individual contact points on the threads and the gearwheels are lubricated by way of a multiple-step lubrication concept. The threads on the bars are lubricated by way of a stationary inlet on the counter-bearing plate that is to be adjusted. By way of this inlet, a lubricant tank feeds directly to the two nuts. Connection ducts 22a, 23a and peripheral grooves 22b, 23b ensure that there is optimum distribution of the lubricant to the thread contact points 22, 23. The drive gearwheel 31 is wetted with the lubricant in the region of tooth engagement, by way of a sump lubrication in a lubricant sump 33 at the lowest point. By rotating the drive gearwheel 31, the lubricant is transferred to the points of contact between the drive gearwheel 31 and the output gearwheel 32. Each lubrication point is supplied by its own supply line 30, which goes from a central lubrication point 29 and lubricant distributors 34, and which according to FIG. 1 is placed on the outside, in a central position readily accessible to the user.

According to the method, the machine operates as follows:

In order to perform the method, an adjustable supporting element is provided for a closing device 20 for moving the movable platen 10 towards the stationary platen 11 and away therefrom. A mould height adjustment device 14 that is drivable by way of a drive 15 is used to adjust the mould height. A locking device releasably locks the supporting element 21 in its current position as a result of biasing locking elements, in other words the nuts 22, 23. According to the method, first the bias is removed by actively relieving the locking elements of load. This releases the locking elements from their current position and at the same time releases the mould height adjustment device 14. Once the mould height adjustment device has been released, then as a result of actuating it the supporting element 21 can be moved out of its current position, which results in a change to the spacing x between the stationary platen 10 and the supporting element 21. Once the changed position has been reached, the mould height adjustment device 14 can be fixed again by locking the locking device 16, by applying the bias.

Since active actuation and hence relieving of load of the locking elements are possible at any time, the locking device may preferably also be unlocked while the movable platen 11 is moving in the closing direction s-s, and/or the mould height adjustment device 14 may be actuated, for the purpose of adjusting the spacing x, while the movable platen 11 is moving. This makes active control of the closing force possible.

In addition, the dynamic operating force on the supporting element 21 can be monitored by a sensor 19 (FIG. 1) such as a sensor on the bar. The objective here is to use the total force characteristic to identify within the opening and closing movement of the movable platen 11 a region within which the total force, acting as a dynamic operating force with no bias, is always in the positive range—that is to say is greater than or equal to zero. FIG. 6 shows a graph with the dynamic operating forces. For this, the operating force with no bias is determined. From a technical point of view, the total force on the adjustment plate must be "zero", since otherwise there would be a movement on the constituent part in the sense of action equals reaction.

FIG. 6 indicates the region that is greater than or equal to zero over the two points A, B. Within this region, a low-wear, low-noise adjustment is possible without changing the load on the thread of the nuts. The total force describes the loads within the guide element 17. Actuation of the mould height adjustment device 14 should take place in a region lasting approximately from the start of the braking procedure in the rearward end position of the movable platen 11 at most until the end of the acceleration phase out of the rearward end position. Throughout this time, the total force applied in the guide element 17 is positive, and the mould height a can be adjusted without changing the load on the movement thread.

The total force can be determined in two ways.

1. The sensors 19 according to FIG. 1 directly measure the forces in the guide element 17 that are caused by the dynamic change in movement. On the basis of these measurement results, it is possible in a defined manner to place the adjustment within the period C in which the total force is greater than or equal to zero. Here, the four sensors 19 may have different sensitivities, with the objective of achieving as far as possible the optimum evaluation both of the maximum force on the bar (closing force) and also of the change in force in the constituent part that is caused by the movement. For this purpose, over the time t of a mould closing procedure, the upper graph in FIG. 6 shows the speed v of the movable platen 11, the distance s travelled by the movable platen 11 and the force F in the guide element 17. It can be seen that a force region in the positive range is established for a period C between the maximum and the minimum speeds of the movable platen 11, in accordance with points A, B.

2. The change in force in the guide element 17 can be calculated indirectly, from the motor torque and the motor speed of the drive of the mould closing unit. In the lower graph in FIG. 6, in the region of dynamic movement, the curve of motor torque is almost identical (in respect of whether it is positive or negative) to the real force curve F in the guide element 17. There, over the time t of a mould closing procedure, there are shown the speed v of the movable platen 11, the distance s travelled by the movable platen 11 and the torque M of the motor. Here too, a period C is established between the points A and B.

It goes without saying that this description may be subject to the most diverse modifications, changes and adaptations which are within the range of equivalents to the attached claims.

LIST OF REFERENCE NUMERALS

10 Stationary platen
11 Movable platen
12 Machine base
13 Injection mould
14 Mould height adjustment device
15 Drive for 14
16 Locking device
17 Guide element
17a Threaded portion
18 Resilient devices
19 Sensor (FIG. 1)
20 Closing device
21 Supporting element
22, 23 Nut
22a, 23a Connection ducts
22b, 23b Grooves
25 Clamping plate
26 Actuation device
26a Piston rod
26b Piston
26c Cylinder chamber
27 Sensor
28 Lubricant tank
29 Lubrication point
30 Lines
31 Drive gearwheel
32 Output gearwheel
33 Lubricant sump
34 Supply connecting piece
35 Lubricant distributor a Mould height
A, B Points
C Period
F Force
M Torque
s Travel
s-s Closing device
t Time
v Speed
x Spacing between 10 and 21
R Mould clamping space

The invention claimed is:

1. A mould closing unit, comprising a device for automatically adapting a mould height of injection moulds of variable height as measured in a closing direction, for an injection moulding machine for processing plastics and other plasticisable materials, comprising,
a stationary platen,
a movable platen,
a closing device for moving the movable platen in the closing direction, towards the stationary platen and away therefrom,
an adjustable supporting element for the closing device,
a mould height adjustment device for adjusting a spacing between the stationary platen and the adjustable supporting element by moving the adjustable supporting element,
a drive for actuating the mould height adjustment device,
a locking device for releasably locking the adjustable supporting element in its current position, biased by locking elements,
wherein during movement of the movable platen in the closing direction towards the stationary platen and away therefrom, the locking device is releasable by removing a bias from the locking elements,
wherein the locking elements are selectively relieved of load or biased by active actuation elements, for the purpose of releasing the mould height adjustment device,
wherein during operation of the injection moulding machine, a monitoring device is provided for monitoring a total force, acting as a dynamic operating force with no bias on the adjustable supporting element, and
wherein the locking elements of the locking device are releasable for removing the bias within a period of time in which the total force is greater than or equal to zero.

2. The mould closing unit according to claim 1, wherein the locking elements are dynamically relievable of load where necessary by actively actuable actuation elements during operation of the mould closing unit.

3. The mould closing unit according to claim 1, wherein the mould height adjustment device is actuable during movement of the movable platen, for the purpose of adjusting the spacing.

4. The mould closing unit according to claim 1, wherein the mould height adjustment device comprises nuts as locking elements, which engage with threaded portions on guide elements for the adjustable supporting element, and are adjustable using the drive.

5. The mould closing unit according to claim 4, wherein at least two nuts are lockable as a result of an action of resilient devices of the locking device.

6. The mould closing unit according to claim 1, wherein the mould height adjustment device comprises nuts as locking elements, and wherein an actuation element is at the same time at least one connection device that operatively connects the nuts to one another.

7. The mould closing unit according to claim 6, wherein at least two nuts are lockable as a result of an action of resilient devices of the locking device.

8. The mould closing unit according to claim 6, wherein the nuts abut against a clamping plate and against the adjustable supporting element, the two of which are operatively connected to one another by the at least one connection device.

9. The mould closing unit according to claim 4, wherein the nuts comprise at least one of connection ducts or grooves that are connected to a lubricant tank for the purpose of conveying lubricant to the threaded portions.

10. The mould closing unit according to claim 1, wherein an actuation element is formed by a piston rod for a piston of a piston-and-cylinder unit, wherein the piston is mounted on the adjustable supporting element and is actuable in opposition to the force of resilient devices.

11. The mould closing unit according to claim 10, wherein the cylinder chamber of the piston-and-cylinder unit is arranged in the adjustable supporting element, and wherein the piston rod mounted on a clamping plate passes through the resilient devices, which are likewise mounted on the adjustable supporting element.

12. The mould closing unit according to claim 10, wherein a biasing force of the resilient devices is greater than the dynamic forces occurring when the injection mould is opened and closed, and wherein a force of the actuation elements is greater than the biasing force of the resilient devices.

13. A method for automatically adapting a mould height of injection moulds of variable height as measured in a closing direction, on an injection moulding machine for processing plastics and other plasticisable materials, comprising,
a stationary platen,
a movable platen,
an adjustable supporting element for a closing device for moving the movable platen towards the stationary platen and away therefrom,
a drive for a mould height adjustment device,
a locking device for releasably locking the adjustable supporting element in its current position, biased by locking elements,
wherein the method comprises the following steps:
removing a bias by actively relieving the locking elements of load and releasing of the locking elements from their respective current position during movement of the movable platen in the closing direction towards the stationary platen and away therefrom during operation of the injection moulding machine,
releasing the mould height adjustment device,
changing a spacing between the stationary platen and the adjustable supporting element by moving the adjustable supporting element using the drive,
fixing the mould height adjustment device by locking the locking device, by applying the bias
wherein during operation of the injection moulding machine, a total force acting as a dynamic operating force with no bias on the adjustable supporting element is monitored, and wherein the bias on the locking elements is removed within a period of time in which the total force is greater than or equal to zero.

14. The method according to claim 13, wherein the mould height adjustment device is actuated during movement of the movable platen for the purpose of adjusting the spacing.

15. The method according to claim 13, wherein the total force is either a direct force measurement using a sensor in the guide element or an indirect guide variable derived from a motor torque curve of a drive motor of the mould closing unit.

* * * * *